United States Patent Office 2,944,016
Patented July 5, 1960

2,944,016

INCREASING OXIDATION STABILITY OF HYDROCARBONS

Charles L. Thomas, Swarthmore, Pa., assignor to Sun Oil Company, Philadelphia, Pa., a corporation of New Jersey No Drawing. Filed Apr. 16, 1958, Ser. No. 728,783

7 Claims. (Cl. 208—284)

This invention relates to improving the oxidation stability of hydrocarbons, and more particularly to the use of a treating agent which selectively reacts with nonhydrocarbon impurities causing poor oxidation stability.

Petroleum fractions as produced by ordinary refining procedures such as distillation, acid treatment, clay treatment, solvent refining, etc. often have unsatisfactory oxidation stability in spite of the refining procedures which have been employed. This unsatisfactory oxidation stability is frequently manifested in excessive discoloration and formation of acidic materials and sludge upon subjection to oxidation. The poor oxidation stability is believed to be caused by nonhydrocarbon materials which are present in petroleum fractions in small amounts. These materials are difficult to remove by ordinary refining procedures, and accordingly the products obtained by such procedures frequently have unsatisfactory oxidation stability.

Problems with respect to oxidation stability caused by small amounts of nonhydrocarbon constituents are also encountered in the case of hydrocarbons from other sources, such as coal tar, shale oil, etc., and difficulties with respect to removing the nonhydrocarbons by ordinary refining procedures are also encountered in these cases.

According to the invention, hydrocarbons having improved oxidation stability are obtained by contacting such hydrocarbons containing nonhydrocarbon impurities with an alkali metal salt of a carboxylic acid containing an alkali metal attached to an alpha carbon atom, i.e. to a carbon atom attached to a carboxyl group in the molecule. Preferred salts are those having the formula MCHRCOOM' where M and M' are each an alkali metal, e.g. sodium, potassium, lithium, etc. and R is hydrogen or a hydrocarbon radical. M and M' may be the same alkali metal, or they may be different alkali metals. The treating agent selectively reacts with those nonhydrocarbon constituents of the charge stock which would otherwise cause poor oxidation stability.

A particularly preferred compound for use according to the invention is sodio-sodium acetate NaCH$_2$COONa. The preparation of this compound is disclosed in an abstract of a paper by D. O. DePree et al., "α-Sodio Sodium Acetate, Preparation and Proof of Structure," Abstracts of Papers, 132d meeting, American Chemical Society, New York, September 8 to 13, 1957, page 26S. The preparation involves the reaction of sodium amide and sodium acetate at 200° C. in an open system. Other treating agents for use according to the invention can be prepared by analogous procedures employing the appropriate alkali metal amide and the appropriate alkali metal carboxylate containing a replaceable hydrogen atom on an alpha carbon atom. The reaction takes place at such hydrogen atom to form a product containing alkali metal in the alpha position.

According to the invention, the treating agent and the hydrocarbon are intimately contacted in order to bring about reaction of the treating agent with nonhydrocarbon constituents normally causing poor oxidation stability. The reaction products which are formed are usually normally solid materials and can be filtered from the treated hydrocarbon. The treating agent itself is also usually a normally solid material, and any excess of treating agent can be filtered from the treated hydrocarbon together with the reaction products. In general, however, it is desirable to use as small an amount of the treating agent as possible, so that excess treating agent is minimized or eliminated. Filter aids or treating clay can if desired be employed to facilitate the filtration of the reaction products from the treated hydrocarbon.

Although filtration is a convenient manner of separating reaction products from the treated hydrocarbon, other suitable procedures can be employed for bringing about this result. For example, the treated hydrocarbon containing the reaction products can be distilled to obtain the treated hydrocarbon or desired fractions thereof as distillates while leaving the reaction products in the residue. Any other suitable manner of removing the reaction products can be employed, such as the use of solvents adapted to selectively dissolve the reaction products.

The temperature of contact between the treating agent and the hydrocarbon can be within the approximate range from atmospheric temperature to 600° F. Preferably the temperature does not exceed 250° F.

During the contact of hydrocarbon and treating agent, the hydrocarbon can be either in liquid or vapor phase, although liquid phase operation is generally preferred.

The hydrocarbon should be substantially free of dissolved or suspended water during its contact with the treating agent. This is desirable since the treating agent is reactive with water, and the presence of excessive amounts of water would result in a large consumption of treating agent. Therefore, it is desirable to minimize the water content and thereby minimize the amount of treating agent required to bring about a given increase in oxidation stability. Any suitable known dehydration procedure can be employed, if necessary or desirable, to prepare the charge stock.

The following examples illustrate the invention:

*Example I*

A reduced naphthenic crude petroleum is distilled under vacuum to obtain lubricating oil constituents in vapor form, and these vapors are contacted with molten sodium hydroxide to remove naphthenic acids from the vapors. The treated vapors are condensed to obtain distillates including one having Saybolt Universal viscosity at 100° F. of about 700 seconds. When this distillate is contacted in a sealed zone with oxygen at 280° F., a decrease in oxygen pressure of 20 mm. of Hg typically occurs in 6.4 hours, indicating an undesirably rapid take-up of oxygen by the oil. When 0.1 weight percent of 2,6-ditertiary butyl paracresol is added to the oil, the time for a 20 mm. of Hg decrease in oxygen pressure is typically increased to 16 hours, which is still in some instances an undesirably rapid take-up of oxygen.

According to the invention, sodio-sodium acetate is added to aliquot portions of this lubricating oil distillate in amounts for example of 0.1, 0.5 and 1.0 percent, and the treating agent and oil are agitated for one hour at 200 F. The reaction products and the excess sodio-sodium acetate are filtered from the treated oil. The oxidation stability of the treated oil as determined by the above test is increased by at least several hours, both in the case where the oil is tested with added ditertiary butyl paracresol as inhibitor, and in the case where an inhibitor is not used. Generally, greater amounts of sodio-sodium acetate based on oil give a greater increase in the oxidation stability within the range employed in this example. The color stability and the resistance of the oil to acid and sludge formation upon oxidation are also increased by the treatment.

This example shows the ability of a treating agent according to the invention to improve the oxidation stability of a straight run distillate from naphthenic base crude.

*Example II*

The charge stock employed in this example is a raffinate obtained in furfural refining of a distillate from paraffinic-naphthenic base crude, the raffinate having Saybolt Universal viscosity of 100 seconds at 100° F. The treatment with sodio-sodium acetate is similar to that described in Example I, and generally similar results with respect to improvement in oxidation stability are obtained as a result of the treatment.

*Example III*

The charge stock employed in this example is an extract obtained in furfural refining of a distillate from paraffinic-naphthenic base crude. The extract has Saybolt Universal viscosities at 100° F. of 4500 seconds and at 210° F. of 95 seconds, specific gravity of about 1.010, refractive index of 1.588 and aromatic hydrocarbon content of 85 weight percent. This extract, after conventional stripping to remove furfural, is a dark-colored material. By contact with one weight percent of sodio-sodium acetate under similar conditions to those disclosed in Example I, the color of the extract is very substantially improved, and the improved color is well retained upon subjection of the treated extract to typical oxidation conditions. The treated extract is considerably improved for use for example as a plasticizer for rubber in cases where good color and freedom from staining are important properties.

*Example IV*

A xylene fraction obtained by distillation of coke oven light oil and having unsatisfactory oxidation stability is treated with α-sodio-sodium propionate in a manner similar to that described in the preceding examples, to obtain a product having substantially improved oxidation stability.

*Example V*

Coker distillate derived from Athabasca tar sands and having A.P.I. gravity of 27.3 and boiling range of about 150 to 750° F. is treated with sodio-sodium acetate in a manner similar to that described in the preceding examples. The product has substantially improved oxidation stability.

Generally similar results are obtained using other treating agents obtained by reacting alkali metal amides with alkali metal salts of carboxylic acids, e.g. butyric acid, caprylic acid, oleic acid, succinic acid, cyclohexyl acetic acid, phenyl acetic acid, etc. Generally similar results are also obtained employing potassium and lithium analogs of the sodium compounds, and also compounds wherein two different alkali metals are present.

As a further example, in the preparation of α-sodio sodium caprylate, stoichiometric amounts of phenylsodium and sodium caprylate are heated in refluxing benzene for five hours. Benzene is then stripped from the product and a residue is obtained which is employed directly as an agent for refining hydrocarbons in the manner previously disclosed. Generally similar results are obtained by substituting sodium cyclohexylacetate or sodium phenylacetate for sodium caprylate in the above preparation, in which case α-sodio sodium cyclohexylacetate and α-sodio sodium phenylacetate are obtained.

The amount of treating agent employed according to the invention is preferably rather low, since the amounts of nonhydrocarbons which are to be reacted with the treating agent are also generally quite low in the charge stock. Usually the amount of treating agent will be within the approximate range from 0.01 to 5 weight percent, and preferably in the range from 0.1 to 1.0 weight percent, based on charge.

The invention is applicable generally to hydrocarbons which contain small amounts of nonhydrocarbon materials normally causing poor oxidation stability. The treating process is particularly beneficial as applied to petroleum lubricating oils, furnace oils, waxes, etc. although lower molecular weight petroleum fractions and hydrocarbons from other sources are beneficially treated in some instances.

The invention claimed is:

1. Process for improving oxidation stability of hydrocarbons which comprises contacting hydrocarbons containing small amounts of nonhydrocarbon constituents normally causing poor oxidation stability with 0.01 to 5 weight percent of an alkali metal salt of a carboxylic acid containing an alkali metal attached to an alpha carbon atom, at a temperature within the approximate range from room temperature to 600° F., thereby to react said compound with nonhydrocarbon constituents.

2. Process according to claim 1 wherein the reaction products are filtered from the treated hydrocarbons.

3. Process according to claim 1 wherein said hydrocarbons are a lubricating oil distillate from a naphthenic base crude petroleum.

4. Process according to claim 1 wherein said hydrocarbons are a raffinate obtained in solvent refining of a lubricating oil distillate from paraffinic-naphthenic base crude petroleum.

5. Process according to claim 1 wherein said hydrocarbons are in extract obtained in solvent refining of a lubricating oil distillate from paraffinic-naphthenic base crude petroleum.

6. Process according to claim 1 wherein said salt has the formula MCHRCOOM′ where M is an alkali metal, R is selected from the group consisitng of hydrogen and a hydrocarbon radical, and M′ is an alkali metal.

7. Process according to claim 1 wherein said salt is sodio-sodium acetate.

References Cited in the file of this patent

Morton et al.: Journal American Chemical Society, vol. 60, pages 1426–1429, 1938.